June 14, 1966   O. W. BURKE, JR., ETAL   3,256,068
APPARATUS FOR THE PRODUCTION OF SILICA PIGMENTS
Filed Oct. 3, 1961                                                 2 Sheets-Sheet 1

INVENTOR
OLIVER W. BURKE JR.
CAREY B. JACKSON,

BY  Hall & Houghton

ATTORNEY

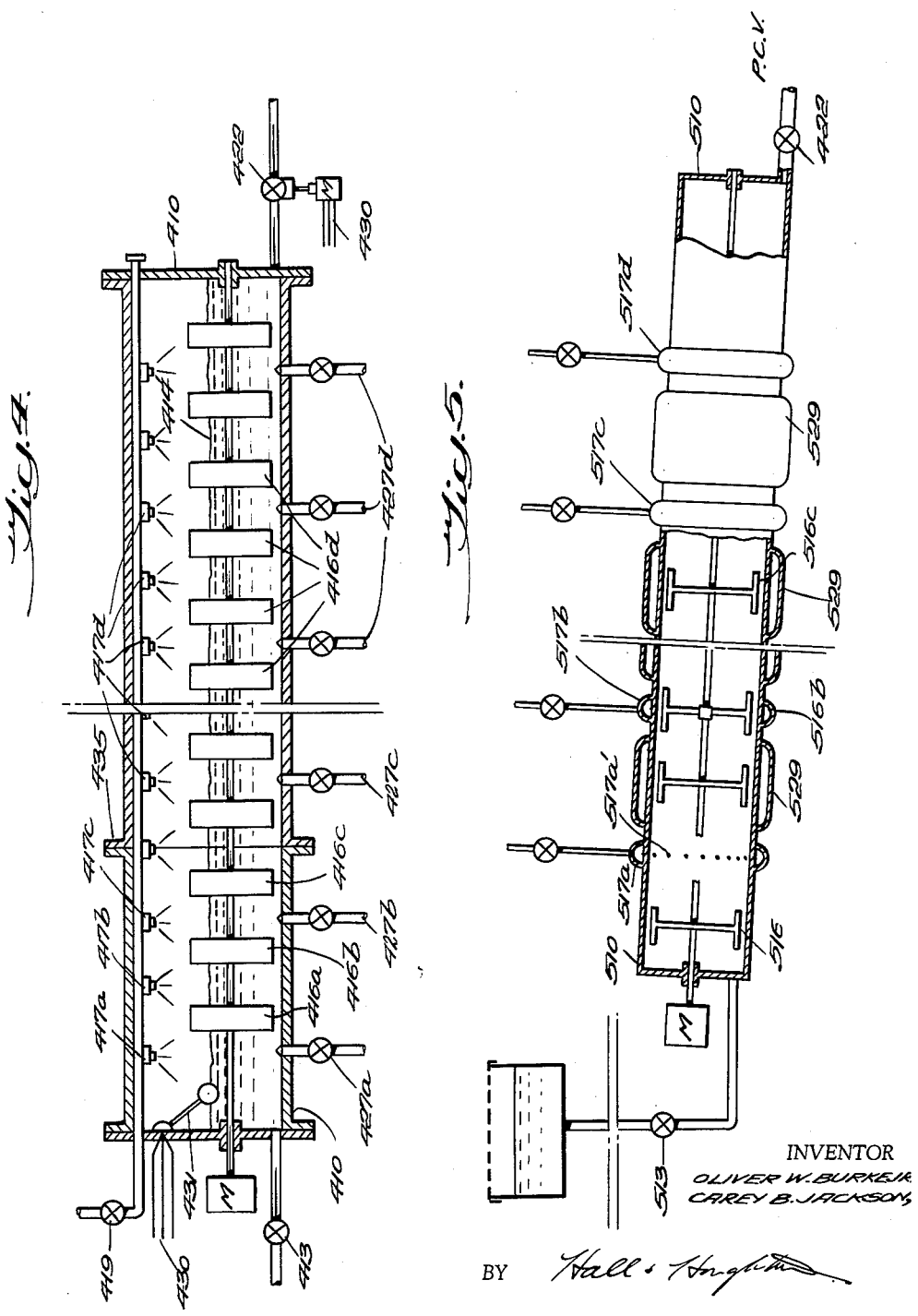

United States Patent Office 3,256,068
Patented June 14, 1966

3,256,068
APPARATUS FOR THE PRODUCTION OF
SILICA PIGMENTS
Oliver W. Burke, Jr., 506 Intracoastal Drive, Fort Lauderdale, Fla., and Carey B. Jackson, Pompano Beach, Fla.; said Jackson assignor to said Burke
Filed Oct. 3, 1961, Ser. No. 142,668
3 Claims. (Cl. 23—285)

This invention relates to apparatus for the production of silica pigments from sodium silicate and aims generally to improve the same.

Objects

Particular objects of the invention, severally and interdependently, are to provide apparatus peculiarly suited for the continuous production of silica pigment of the rubber reinforcing type; to provide apparatus for flowing the aqueous sodium silicate solution through a series of reaction zones in a single pass and for introducing acidulating fluid thereinto in a manner promoting the uniformity of reduction of alkalinity of the solution in each zone; to provide apparatus for producing turbulence, but preferably not violent agitation, at each zone; to provide means facilitating the injection of acidulating liquid and/or gas at respective zones; to provide means for adjusting the flow of acidulating fluids to the respective zones in relation to each other and to the rates of flow of the aqueous sodium silicate solution through said zones for regulating the relative rates of acidulation at the respective zones; to provide means for introducing non-acidulating electrolyte into selected ones of said respective zones; and generally to provide simple and effective combinations of apparatus for the purposes described.

Other objects and advantages of the invention will be apparent from the following description of illustrative embodiments thereof. The invention resides in the new and useful features and the new and useful combination of features hereinafter described, and is more particularly pointed out in the appended claims.

Drawings

In the accompanying drawings of illustrative embodiments of the invention FIGS. 1 to 5 are diagrams in side elevation or longitudinal cross section of respective embodiments of the invention, with paired broken lines indicating portions omitted for compactness of illustration.

General description

It is known that one can prepare silica pigment material suitable for the reinforcement of rubber by gradual acidulation of aqueous sodium silicate solution with or without the presence of excess sodium ion. Thus in British Patent No. 299,483 (Peter Spence & Sons Ltd.) acceptance Oct. 29, 1928, such a silica pigment is produced in a substantially pure, extremely light form by neutralizing the alkali of a sodium silicate solution in the presence of a suitably regulated amount of sodium carbonate, by the gradual addition of sodium bicarbonate or carbon dioxide, the sodium carbonate being already present or being added as required, or being formed by the gradual addition of a solution of sodium bicarbonate or carbon dioxide. In British Patent No. 561,750 (E. K. Cole, Ltd.) accepted June 2, 1944, a similar process is disclosed, acidulating sodium silicate by the gradual addition of a mineral acid in the presence of electrolytes including sodium chloride and salts of weak acids or weak bases or both. By these processes it is known to obtain a gradual separation of the silica in a nongelatinous, somewhat flocculent, easily filterable white and opaque condition in combination or association with a portion of the alkali and in a physical condition such that after removal of the mother liquor, washing with water, after-treating with dilute acid and again washing and drying, the silica pigment shrinks but little compared with silica gel and is in an extremely light, white, soft and bulky form.

In the precipitation of silica by such known gradual acidulation of sodium silicate solutions as heretofore practiced, it is established practice to add acidulating agent at a constant slow rate throughout the course of the acidulation at least until all the silica has been precipitated. Only by so doing has it been considered possible to obtain silica in the form of pigment rather than in the form of a gel.

In our copending applications Ser. Nos. 142,494 now U.S. Patent No. 3,202,525; 142,496 and now abandoned; 142,661 and now abandoned; 142,662 now U.S. Patent No. 3,172,726; 142,665 now U.S. Patent No. 3,172,727, filed concurrently herewith, we have disclosed improved processes in which recycling is employed, in which the rates of acidulation are varied as the acidulation proceeds to obtain definite improvements, in which different acidulating agents are employed at different stages of the process to obtain definite advantages, in which electrolyte is introduced in a new manner to obtain certain improvements, etc.

In the practice of the known prior art processes above referred to, it has been the practice to form a confined body of an aqueous sodium silicate with or without a content of electrolyte in a vessel or tank and to then treat said body batchwise by the gradual addition of a single selected acidulating agent thereto until the mole ratio of the total silica in the body to the unneutralized sodium oxide of the body reached a value such that the sodium silicate become gradually separated from the solution in the form of silica pigment. In common with the prior art the above mentioned improvements of our copending applications may likewise be practiced in a batchwise manner. However by the present invention it is made possible to practice the process of gradual acidulation of sodium silicate solution, and our above mentioned improvements thereon, in a continuous manner, with better and/or more flexible control of the reacting and separation modifying agents. Thus the present apparatus may be employed for the continuous practice of any of the aforesaid processes.

In general in its several species the present invention comprises (a) means defining a series of reaction zones, (b) means for turbulently flowing sodium silicate solution in a single pass through said zones in sequence, and (c) means in each zone for injecting thereinto simultaneously at a plurality of points finely divided acidulating fluid whereby uniformity of reduction of alkalinity in each zone is promoted notwithstanding the continuous flow of the stream being acidulated. In particular species the means (a) comprises spray nozzle means preferably positioned above the level of the turbulently flowing liquid in the reaction zones when liquid acidulating fluid is being employed, and preferably positioned below the level thereof when gaseous acidulating fluid is being employed, and which may be positioned or positionable in both locations e.g. when both types of fluid are being employed. In other species the invention also comprises (d) means in respective zones for injecting thereunto aqueous salt solution, i.e., aqueous electrolyte solution other than acidulating agent, for assisting in determining the size and nature of the silica pigment material formed such that it can constitute a reinforcing filler for rubber and the like.

Detailed description of particular embodiments

Figure 1:
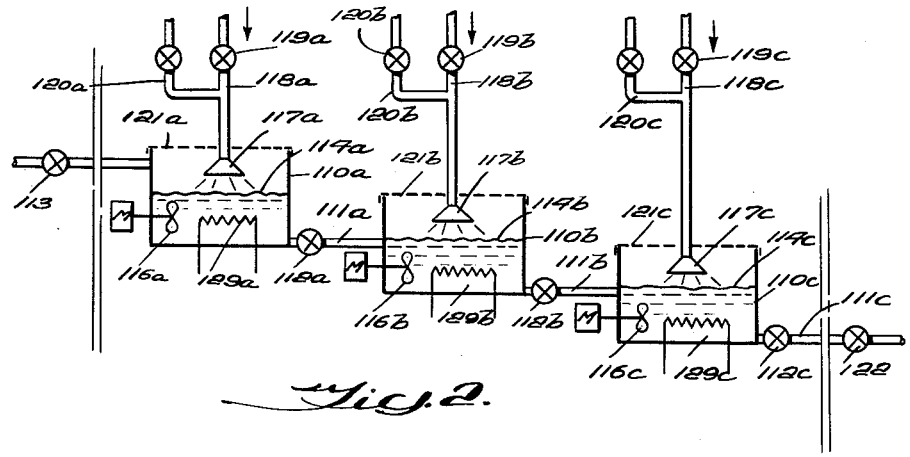

Referring now to the drawings, in FIG. 1 the means defining a series of reaction zones comprises a series of vessels 110a, 110b, etc., connected in cascade or series by conduits 111a, 111b, etc., respectively provided with flow control means shown as valves 112a, 112b, etc., which may be adjusted manually or by level controlled means as hereinafter described, to maintain predetermined mean liquid levels 114a, 114b etc., of the turbulently flowing liquid in the respective zones. The means (a) also includes an inlet conduit 113 for delivering the aqueous sodium silicate solution from any suitable supply, as an elevated tank, or other supply under pressure, which inlet is preferably provided with a control valve adjustable manually or by automatic means responsive to the level of liquid in the tank 110a, for example, for maintaining the supply at such a rate as to properly maintain the liquid levels in the respective tanks.

Still referring to FIG. 1, the means (b) for turbulently flowing the solution through the series of tanks also comprises agitating means at each zone, herein shown in the form of motor driven submerged impellers 115a, 115b, etc., of the fan blade type located in the respective vessels 110a, 110b etc.

This means (c) for injecting into the turbulently flowing liquid at each zone simultaneously at a plurality of points finely divided acidulating fluid in FIG. 1 comprises suitable means such as spraying nozzles or spray heads 117a, 117b, etc., associated with the respective vessels, and provided with individual supply pipes 118a, 118b, etc., which are respectively controlled by valve means 119a, 119b, etc., adjustable to regulate the flow of acidulating fluid into the turbulently flowing liquid in the associated tank to suit the requirements of the process as being carried out therein. In this embodiment the means (d) for supplying the electrolyte to the respective tanks or vessels 110a, etc., may consist of further nozzles such as those just described, connected to a suitable source of electrolyte solution and associated with certain of the said vessels, preferably those associated with the early stages of the acidulation, or may consist of valved supply connections such as 120a, 120b, etc., for delivering the electrolyte solution through selected ones of the spray heads 117a, 117b, etc., along with or in alternation with the acidulating fluid supplied therethrough.

Still referring to FIG. 1, in the form there shown the tanks or vessels 110a, 110b, etc., may be uncovered, but preferably are covered or closed as indicated by dotted lines as 121a, 121b, etc. The level of the free surface 114a, 114b, etc., maintained in each vessel or in selected vessels may be raised or lowered by adjustment of the valve means 112a, 112b, etc., and 113, or the nozzles 117a, 117b, etc., may be lowered, when it is desirous to inject the acidulating fluid below the free surface of the liquid 114a, or 114b, etc.

In operation, in FIG. 1 the sodium silicate solution to be acidulated is admitted to the first of the series of vessels by the valve 113 and agitated by agitator 116a while acidulating fluid is sprayed thereinto by the spray head means 117a, at a rate so correlated with the rate of throughput established by the adjustment of the valves 112a and 113 as to statistically effect a predetermined degree of acidulation of the flowing liquid. As above noted for practicing the invention of our application Ser. No. 142,496, electrolyte solution may also be supplied to this vessel along with the acidulating fluid. The liquid then flows from vessel 110a through the valve controlled conduit 111a to the next vessel of the series, 110b, wherein it is further agitated and acidulated and/or supplied with electrolyte solution as just described, so that statistically the solution attains a further predetermined degree of acidulation and/or electrolyte concentration in this vessel. After passing through several vessels, the exact number of which may be determined by the rate and degree of acidulation and/or electrolyte addition to be effected in each, a point will be reached at which precipitation of silica is incipient, i.e., is about to commence or has just started to commence. At this time, in the practice of the invention of our copending application Ser. No. 142,661 it is desirable to considerably augment the rate of acidulation for reasons therein set forth. Accordingly, in using the present apparatus for carrying out this process the flow rate and rates of acidulation are preferably so adjusted that the solution being acidulated passes, as it reaches such state of incipient precipitation, into another vessel, herein exemplified by the vessel 110c, in FIG. 1, to which acidulating fluid is supplied at a considerably greater rate per unit volume of the solution being acidulated, than is the case in the earlier vessels of the series. In this vessel and/or one or more succeeding vessels, the acidulation is carried to completion, and if desired, additional acidulating agent may be added to aid in reducing the alkalinity of the precipitated silica as compared to the alkalinity thereof as precipitated. When the desired degree of precipitation and acidulation has been statistically attained in the last tank of the series, the silica slurry is delivered therefrom through valved outlet means as exemplified at 122 for separation of the silica from the solution, washing thereof, after-treatment as desired, and final washing and drying to produce a silica pigment material suitable for the reinforcement of rubber.

As above mentioned, the vessels 110a, etc., may be closed, and in such case may be run completely or substantially full of liquid, as will be apparent from the description of closed embodiments hereinafter. In such event, the closed reaction zone or zones may be operated under pressure, and the inlet and outlet valves may be adapted for such operation. When the process performed is conducted at elevated temperature, suitable provision for heating may be made, as illustrated at 129a, 129b, etc., wherein heating coils selectively operable for heating the respective tanks as desired, are indicated.

Figure 2:
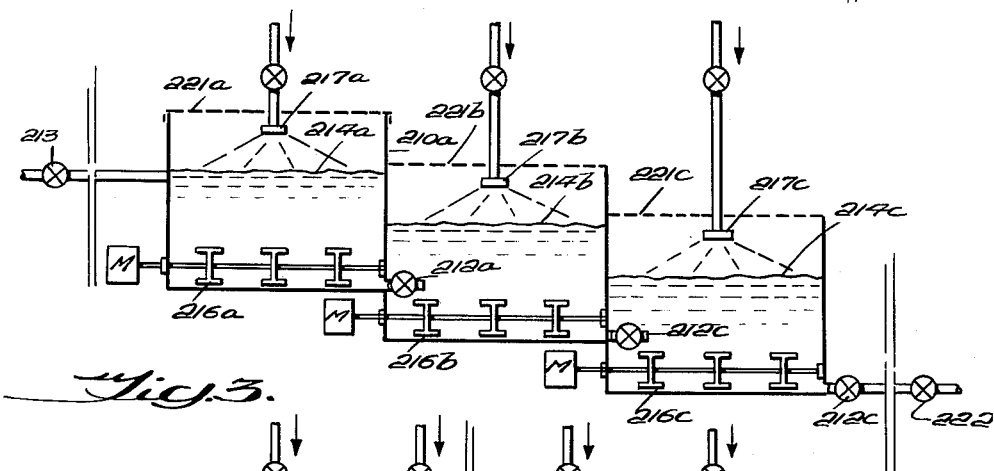

Turning now to FIG. 2, the embodiment therein shown is generally similar to that of FIG. 1 and the corresponding parts are designated by like reference numerals increased by 100 in number as compared to FIG. 1. In this form, in lieu of the fan blade type agitators shown in FIG. 1 paddle type agitators 216a, 216b, etc., appropriately driven through speed reducing motors are employed, and it will be understood that these may be of any suitable construction and may be used interchangeably with any other form of agitator suitable for the purpose as, for example, the form 116a. In this embodiment, the liquid levels in selected ones of the vessels may be adjusted so that the paddles of the agitators 216a, etc., may remain completely submerged as shown, or so that they will break through the free surface of the liquid being treated. The latter condition may be desirable in the intial stages of the acidulation as well as in the addition of electrolyte solution to the flowing sodium silicate solution, when such is to be employed and is not already present in the solution as introduced through the inlet valve 213. The modes of operation of this form are similar to and as flexible as those of the form of FIG. 1.

Figure 3:
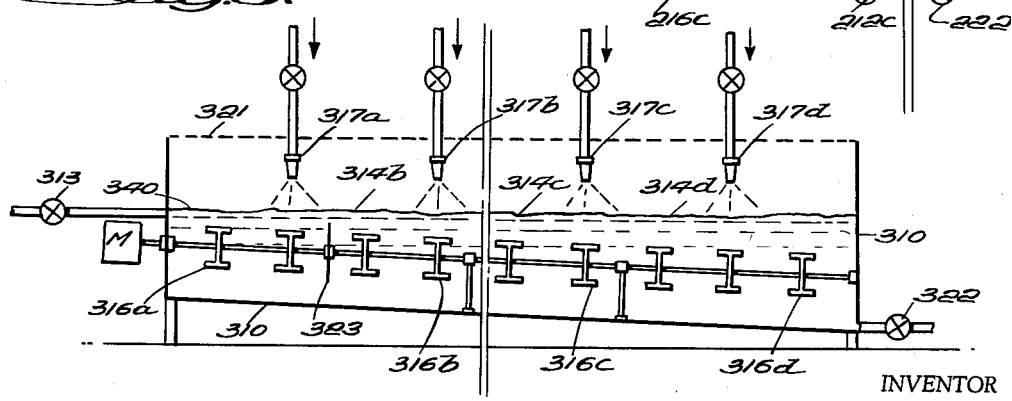

In the embodiment of FIG. 3, the means defining a series of reaction zones takes the form of a relatively narrow elongated vessel or trough 310, which preferably has a slightly sloping bottom as shown, to facilitate draining of the apparatus, and which preferably is provided with cover means 321 constructed of sections which may be removed when desired. This trough may be considered as corresponding to a series of interconnected reaction zones each defined by the walls of the trough proximate to the respective nozzle means 317a, 317b, etc., which correspond to the spray devices of the embodiments of FIGS. 1 and 2. The elements corresponding to those in the said figures are identified by similar reference numerals of the 300-series. In this form, the agitating means shown as paddles 316a, 316b, etc., for the respective zones, are carried on a common shaft driven by a single motor means and the free surfaces of the several zones 314a, 314b, etc., are at the same level, substantially, and form a single continuous free surface. The modes of operation are generally similar to those of FIGS. 1 and 2 except that the relative length and narrowness of the trough may be relied on to regulate the uniformity of progress of the acidulation, etc., as the sodium silicate solution being treated progresses down the trough. However, baffles, shown as circular plates 323 carried by the shaft of the paddle agitators 316a, 316b, etc., and as of less area than that of the cross section of the trough, may be employed to provide a further guard against channeling of the solution through lateral portions of the trough. This may be desirable, especially when operating at such temperatures as require prolongation of the time employed for completion of the slow acidulation necessary to produce pigment capable of serving as a rubber reinforcing filler after appropriate conditioning.

FIG. 4 illustrates an embodiment of the invention in which a closed conduit made up of one or more closed pipes or tubes may constitute the means defining the series of reaction zones. In the form shown a single run 410 of pipe, say twenty-four inches or so in diameter, the particular diameter being non-critical, is arranged generally horizontally, although it may be arranged to slope slightly toward its discharge end if desired. The agitator means in the form shown is comprised of a number of paddles carried by a common shaft and driven by a single motor, and may be arranged either symmetrically on the axis of the pipe 410, or to rotate about an axis below said pipe-axis as shown. The inlet valve 413 is adjusted to admit the quantity of sodium silicate per minute desired to flow through the series of reaction zones defined by the conduit 410 and the associated fluid injectors 417a, 417b, etc., and 427a, 427b, etc., and the outlet valve 422 is controlled, preferably automatically, to maintain said conduit filled to a predetermined level with the agitated aqueous flow, the surface of the flow at said level constituting a free surface 414, as indicated, which extends along the conduit in spaced relation to the top and bottom portions thereof, leaving a free space thereabove. In this form, especially when the acidulating fluid is a liquid, such liquid may be injected through a series of nozzles 417a, 417b, etc., preferably of the type individually adjustable to control the rate of flow therethrough, supplied with acidulating fluid from one or more sources through valve means 419, said nozzles 417a, etc., being located in the free space above the liquid level in the conduit and spraying the acidulating liquid in controlled amounts onto various portions of said free surface in accordance with the degree of acidulation to be accomplished at the zone concerned. When gaseous acidulating fluid is being employed at one or more of the reaction zones, and when electrolyte is being introduced at selected ones of the reaction zones, such materials are preferably injected through submerged jets or nozzles 427a, 427b, etc., as shown, which may be individually controlled as described in connection with the nozzles 117a, etc., of FIG. 1. As an example of the automatic control which may be employed to regulate the liquid levels in the vessels employed in the several embodiments of the invention, there is shown in FIG. 4 an outlet valve 422 of the reversing-motor adjusted type, electrically connected, as by three wire leads 430, with switch means 431 responsive to the liquid level of the solution to be controlled. As in connection with FIGS. 2 and 3, the liquid level may be adjusted to fully submerge the paddle agitators 416a, etc., or to allow them to break through the free surface of the liquid into the free space thereabove, if desired. The operation of this form of the invention is similar to that above described as will be clear to one skilled in the art from the correspondence of reference numerals, raised however to the 400-series in the case of this embodiment.

FIG. 5 shows another form of the invention in which the series of reactors is again embodied in the form of a single closed conduit 510, shown as somewhat inclined to the horizontal, and running full of liquid, with the agitator 416a, etc., of the paddle type arranged axially of the conduit and with its paddles travelling quite close to the cylindrical walls of the conduit. In this form, which is especially adapted for acidulation with gaseous acidulating agent, the acidulating agent is injected through injecting means 517a, 517b, etc., in the form of manifolds associated with the conduit 510 and having series of fine orifices leading into the conduit 510 as shown at 517a, for forceably injecting the gas into the solution in a plurality of finely divided streams with sufficient force to prevent the collection of precipitate at the mouths of the orifices. When the conduit runs full, as in this embodiment, the inlet valve 513 may be adjusted to control the rate of flow through the process, and the outlet valve may be and preferably is a pressure maintaining valve so that the treatment with gaseous acidulating agent may be affected under pressure. Alternatively, the valve 422 may be adjusted to control the flow of liquid through the apparatus, and the pressure may be maintained by supplying the sodium silicate solution under pressure, as from a pump, or from an elevated supply tank, as shown. When operating under pressure, of course the reactants supplied through manifolds will be supplied at still higher pressure. When the process requires operation at elevated temperatures, suitable heating means may be provided, herein illustrated as heating jackets, as indicated at 529. Also, as shown, at least some of the paddle agitator elements are preferably arranged to sweep in close proximity to the orifices through which acidulating agent may be introduced, to aid further in preventing any local precipitation of silica at said orifices prior to the general separation thereof throughout the acidulated material proximate to the discharge end of the system. As will be appreciated by those skilled in the art, the manifolds and drilled orifices of FIG. 5 can be replaced by other suitable injecting means, for example: by annular manifolds received within the conduit or between flanged joints therein (see flanged joint 435 in FIG. 4) having drilled or nozzle inlets, or screen-formed inlet surfaces extending partly or completely around the periphery of the side walls of the conduit, or porous frit surfaces so extending, and adapted for the injection of the acidulating agent simultaneously at a plurality of points in finely divided form so that uniformity of reduction of alkalinity in each zone will be promoted in accordance with the present invention.

While there have been described herein what are at present considered preferred embodiments of the invention, it will be obvious to those skilled in the art that minor modifications and changes may be made without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

We claim:

1. Apparatus for the continuous production of silica pigment by the acidulation of aqueous sodium silicate solution, said apparatus comprising (a) means embracing a series of reaction zones, (b) means for turbulently flowing aqueous sodium silicate solution in a single pass through said zones in sequence, and (c) means in more than one of said zones for injecting thereinto acidulating fluid, and wherein said means (a) comprises a closed elongated conduit having an inlet means at one end for introducing aqueous sodium silicate solution into the conduit and having an outlet means at its other end for discharging from the conduit the slurry of silica pigment precipitate produced by the reaction, said means (c) comprising a series of inlet means for acidulating gas spaced along the length of said conduit and located below the liquid level therein and, with said conduit, defining said series of reaction zones, and means for adjusting the flow of acidulating gas to the respective zones through said respective gas inlet means, relative to each other and to the rate of flow of said aqueous solution through said closed conduit, for regulating the relative rates of acidulation of said solution effected at the respective zones, and said means (b) comprises agitating means in each zone and means for maintaining said conduit filled to a predetermined level with said aqueous flow.

2. Apparatus according to claim 1, wherein said closed elongated conduit extends substantially horizontally, and said predetermined level extends along the conduit in spaced relation to the top and bottom portions thereof.

3. Apparatus according to claim 1, wherein said closed elongated conduit extends substantially horizontally and said predetermined level is in contact with the top of said horizontal conduit.

References Cited by the Examiner

UNITED STATES PATENTS

| | | | |
|---|---|---|---|
| 526,076 | 9/1894 | Griffin | 23—285 X |
| 1,252,648 | 1/1918 | Barnett et al. | 23—285 X |
| 2,377,435 | 6/1945 | McKee | 23—285 X |
| 2,527,340 | 10/1950 | Taylor | 23—65 |
| 2,630,302 | 3/1953 | Jones | 23—285 X |
| 2,646,345 | 7/1953 | Otto | 23—260 |
| 2,787,521 | 4/1957 | Roberts et al. | 23—65 |
| 3,111,384 | 11/1963 | Heckathorn et al. | 23—165 X |

MORRIS O. WOLK, *Primary Examiner.*

MAURICE A. BRINDISI, *Examiner.*

E. STERN, J. H. TAYMAN, *Assistant Examiners.*